US007087655B2

(12) United States Patent
Tucker et al.

(10) Patent No.: US 7,087,655 B2
(45) Date of Patent: Aug. 8, 2006

(54) SEPARATION PROCESS FOR MULTI-COMPONENT POLYMERIC MATERIALS

(75) Inventors: J. David Tucker, Woodstock, GA (US); David Lewis Myers, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 404 days.

(21) Appl. No.: 10/320,805

(22) Filed: Dec. 16, 2002

(65) Prior Publication Data

US 2004/0112994 A1    Jun. 17, 2004

(51) Int. Cl.
*C08J 11/06* (2006.01)
*B29B 17/02* (2006.01)

(52) U.S. Cl. .................... 521/40; 521/40.5; 521/41; 521/45; 521/45.5; 521/46; 521/46.5; 521/47

(58) Field of Classification Search ............... 521/40, 521/40.5, 41, 45, 45.5, 46, 46.5, 47
See application file for complete search history.

(56) References Cited

U.S. PATENT DOCUMENTS

| | | | |
|---|---|---|---|
| 2,612,479 A | | 9/1952 | Kirby et al. |
| 2,639,278 A | | 5/1953 | Stott et al. |
| 2,742,440 A | | 4/1956 | Stott et al. |
| 2,809,944 A | | 10/1957 | Sverdrup |
| 2,853,742 A | | 9/1958 | Dasher |
| 4,025,990 A | | 5/1977 | Lovette, Jr. |
| 4,240,587 A | | 12/1980 | Letsch |
| 4,720,415 A | * | 1/1988 | Vander Wielen et al. ... 428/152 |
| 5,061,735 A | * | 10/1991 | Zielinski ................. 521/46.5 |
| 5,122,641 A | | 6/1992 | DeChurch |
| 5,168,727 A | | 12/1992 | Snellink et al. |
| 5,220,107 A | | 6/1993 | Kubacki |
| 5,232,606 A | | 8/1993 | Leidner |
| 5,284,625 A | | 2/1994 | Isayev et al. |
| 5,336,552 A | * | 8/1994 | Strack et al. ............... 442/361 |
| 5,385,950 A | | 1/1995 | Mahler |
| 5,397,825 A | | 3/1995 | Segrest |
| 5,565,158 A | | 10/1996 | Sullivan et al. |
| 5,750,658 A | | 5/1998 | Coelho et al. |
| 5,758,831 A | | 6/1998 | Collins et al. |
| 5,807,490 A | * | 9/1998 | Davis et al. ................ 210/739 |
| 5,852,062 A | | 12/1998 | Carpenter |
| 5,872,205 A | * | 2/1999 | Balke et al. ............ 528/502 F |
| 5,917,011 A | | 6/1999 | Duda et al. |
| 5,936,015 A | | 8/1999 | Burns |
| 6,036,726 A | | 3/2000 | Yang et al. |
| 6,180,685 B1 | | 1/2001 | Khait |
| 6,333,373 B1 | | 12/2001 | Rouse et al. |
| 6,335,376 B1 | | 1/2002 | Allen, III et al. |

FOREIGN PATENT DOCUMENTS

WO    WO 01/88245 A2    11/2001

* cited by examiner

*Primary Examiner*—Tae H. Yoon
(74) *Attorney, Agent, or Firm*—Pauley Petersen & Erickson

(57) ABSTRACT

A method of separating at least one polymer from a mixture of polymers. The method includes adjusting the temperature of the mixture, either by heating or cooling, to bring the temperature to a temperature at which decombination of the polymer mixture occurs. Mechanical energy is also imparted to the mixture, before, during or after temperature adjustment. The temperature adjustment and application of mechanical energy enable at least one polymer to be separated from the other polymers in the mixture.

31 Claims, No Drawings

SEPARATION PROCESS FOR MULTI-COMPONENT POLYMERIC MATERIALS

BACKGROUND OF THE INVENTION

This invention is directed to a method of separating at least one polymeric component from a multi-component polymeric material. The method is particularly suitable for separating mixed polymer waste streams.

A considerable amount of mixed polymer waste is generated from lamination processes and other textile manufacturing and/or treatment processes including bi-component and bi-constituent fibers. In some situations, the polymer waste can be added back into the parent process or into another process without any treatment of the waste. However, not all polymer waste is compatible with other processes or even with one of the parent processes from which the material is produced. Typically, certain elements of the waste can be reused for certain applications while other elements of the waste can be reused for other applications. Separating the elements of the waste stream is often difficult, and in some cases may be deemed infeasible.

Separation processes typically use at least one physical property difference between components to facilitate separation. For example, solvent-based separation techniques can be used to separate one or more polymers from a waste stream by dissolving or softening one or more components of the waste stream in the solvent and filtering out the remaining solids. The mechanism may vary based upon the polymers used and the means by which the polymers are adhered together. In some scenarios, the polymer laminate may be adhered due to the thermal lamination of the polymers directly without the addition of any adhesives or other additives at the interface of the components. In other scenarios, the polymers may be adhered by adhesive lamination. In either scenario, the presence of solvents can cause the adhesive to soften or dissolve to the extent that adhesion is lost or the solvent can cause the polymers to swell to such an extent that adhesion is lost. However, solvents may negatively affect one or more of the polymers in the waste stream thereby negating the purpose of reclaiming the polymers from the waste stream.

Another separation process used to separate mixed waste streams may include chopping or shredding the multi-component waste and separating the resulting mixed waste stream by density. This method is effective in cases where the density of one or more components is higher than the density of the solvent, and/or the density of another component or components is less than that of the solvent.

There is a need or desire for a method of separating one or more polymers from a polymer waste stream without damaging or destroying the reclamation polymer while also providing an environmentally friendly means of separation that does not utilize solvents that are difficult to remove from the resulting waste streams and pose disposal concerns.

SUMMARY OF THE INVENTION

In response to the discussed difficulties and problems encountered in the prior art, a method of separating one or more polymeric components from a multi-component polymeric material has been discovered. The method is particularly useful in separating one or more reclamation polymers from a mixed polymer waste stream.

It has been discovered that at least one polymeric component can be separated from a multi-component polymeric material by either fracturing or imparting high levels of mechanical energy to the material within a prescribed temperature range. The temperature may be either raised or lowered to bring the material to a temperature at which decombination of the mixture occurs. In one embodiment, for example, the prescribed temperature range may be determined by differences in the glass transition temperature between polymeric components and/or the temperature at which adhesion is lost between the various components. By fracturing at least one component to the extent that the size and/or geometry of that polymeric component is altered, separation is possible using conventional separation techniques. By causing delamination or any loss of adhesion between the various components, separation is also possible based upon differences in physical properties or geometries using conventional separation techniques.

More specifically, the method of the invention includes heating or cooling a multi-component polymeric material, such as a mixed polymer waste stream, to bring the temperature to a level at which separation becomes possible upon the addition of mechanical energy. The material may be heated or cooled and subsequently exposed to mechanical energy, or mechanical energy may be imparted to the material prior to adjusting the temperature, or the temperature change and application of mechanical energy may simultaneously be imparted to the material. Alternatively, the material may first be heated or cooled, returned to ambient temperature, and subsequently exposed to mechanical energy while at ambient temperature.

In one embodiment of the invention, the method further includes grinding the cooled material at a temperature between a glass transition temperature of one polymeric component and a glass transition temperature of another polymeric component in the waste stream, such that the polymeric component with the higher glass transition temperature can be fractured. For example, the polymeric component with the higher glass transition temperature can be ground to powder form while the polymeric component with the lower glass transition temperature remains fibrous even when ground. Once the material has been ground, a reclamation polymer can be separated from the remainder of the waste stream by screening, using fluidized beds, or any other suitable separation technique that can be used to separate particles of different sizes, geometries, or by leveraging physical property differences.

The method of the invention is particularly suitable for separating mixed polymer waste streams from such processes as stretch-bond laminating processes and vertical filament laminating processes, and from waste streams resulting from the manufacture of a variety of materials such as nonwoven fabric made with multi-component polymeric strands. The method can be used to separate polypropylene, polyethylene, and/or linear low density polyethylene, for example, from such waste streams.

With the foregoing in mind, it is a feature and advantage of the invention to provide a process for separating one or more polymeric components from a multi-component polymeric material without damaging or destroying the reclamation polymer while also providing an environmentally friendly means of separation that does not utilize solvents that are difficult to remove from the resulting waste streams or pose disposal concerns.

DEFINITIONS

Within the context of this specification, each term or phrase below will include the following meaning or meanings.

"Ambient temperature" refers to a temperature in an environment in which the method of the invention is carried out. In many cases, ambient temperature may be a typical room temperature, generally between about 20 and 25 degrees Celsius.

"Decombination" refers to a separation of components of a mixture, which components are initially in intimate contact with each other due to chemical or physical forces, into a weakly agglomerated form. The components may be polymeric and/or non-polymeric. Once separated into a weakly agglomerated form the components are no longer in intimate contact; however, this is not meant to exclude the situation where the components still weakly adhere to one another.

"Fiber" or "fibrous" is meant to refer to a particulate material wherein the length to diameter ratio of such particulate material is greater than about 10.

"Linear low density polyethylene (LLDPE)" refers to polymers of ethylene and higher alpha-olefin comonomers such as $C_3$–$C_{12}$ comonomers, and combinations thereof, having a density of about 0.900 to 0.94 g/cm$^3$.

"Nonwoven" or "nonwoven web" refers to materials and webs or material having a structure of individual fibers or filaments which are interlaid, but not in an identifiable manner as in a knitted fabric. The terms "fiber" and "filament" are used interchangeably. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.)

"Polymers" include, but are not limited to, homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

"Powder" refers to finely dispersed solid particles, typically between about 5 and about 1000 microns, or between about 10 and about 500 microns, or between about 10 and about 100 microns in diameter, with diameter being measured across the largest cross-sectional area of the particle.

"Reclamation polymer" refers to a polymer that is recovered from waste material.

These terms may be defined with additional language in the remaining portions of the specification.

DESCRIPTION OF PREFERRED EMBODIMENTS

The present invention is directed to a method of separating one or more polymeric components from a multi-component polymeric material. The method is particularly useful in separating one or more reclamation polymers from a mixed polymer waste stream.

The method of the invention uses differences in temperature profiles between polymeric components to enable separation. For example, below the glass transition temperature, energy dissipation by the amorphous phase of a glassy or semi-crystalline polymer is greatly reduced and the material becomes much more brittle. In many mixed material streams, one material is far more brittle than others below specific temperatures. As another example, some adhesives embrittle or degrade at increased, or above-ambient, temperatures. When a material is in a brittle state it is more prone to be fractured to a reduced particle size if subjected to grinding. By grinding a stream of mixed polymeric materials at a temperature that allows one or more components within the stream to be fractured, separation of the polymeric materials becomes possible. Similarly, by imparting a high level of mechanical energy to the material at higher or lower temperatures, the reduced adhesion due to the adjusted temperature is not sufficient to withstand delamination. The high level of mechanical energy may be induced by impact, shear, and/or ultrasonic forces, for example. This does not necessarily result in reduced sizes for the individually separate components but provides the needed separation nonetheless.

In the method of the invention, the multi-component polymeric material, or mixed polymer waste stream, can be cooled using suitable liquid, gas, or solid agents. In one embodiment, for example, the material can be cooled by adding liquid nitrogen or other suitable coolant in the liquid or gaseous state to the material, thus cooling the material to a prescribed temperature range. In other embodiments, the multi-component polymeric material can be heated using suitable liquid, gas, solid, or radiation agents. For example, the material may be heated through radiation using either infrared or microwave radiation.

The prescribed temperature range is a range at which decombination of the polymer mixture occurs. As defined herein, the term "decombination" refers to a separation of components of a mixture, which components are initially in intimate contact with each other due to chemical or physical forces, into a weakly agglomerated form. Once separated into a weakly agglomerated form the components are no longer in intimate contact, but may still be weakly adhere to one another. In one embodiment, for example, the prescribed temperature range is the range below a glass transition temperature of a targeted reclamation polymer or polymers and above a glass transition temperature of other material(s) in the mixture, or is suitably low to facilitate separation due to a loss of adhesion.

The prescribed temperature range varies depending on the polymers present in the mixture. While in the prescribed temperature range, the mixture is ground or otherwise exposed to high levels of mechanical energy. Liquid nitrogen may be added to the mixture or another suitable cooling or heating technique may be used while the mixture is in a grinding device or similar device that provides sufficient mechanical energy to initiate separation to initially cool or heat the mixture. Thus, the mixture may be exposed to mechanical forces prior to adjusting the temperature as well as while the temperature is changing. Alternatively, the mixture may first be heated or cooled and then transferred to a grinding device or similar device that provides sufficient mechanical energy to initiate separation. In yet another embodiment, the mixture may be heated or cooled to reach the prescribed temperature range, then allowed to cool or heat to return to ambient temperature such that the mechanical energy may act upon the mixture at ambient temperature. The feasibility of such timing is specific to the polymers within the mixture.

In some embodiments, depending upon the polymers within the mixture, the temperature may need to be raised or lowered only a moderate amount, such as ±10 degrees Celsius, to achieve a temperature within the prescribed temperature range.

Grinding or otherwise imparting mechanical energy to the mixture in the prescribed temperature range fractures the reclamation polymer to a smaller particle size and/or different geometry than the remaining polymers in the mixture or provides delamination, thus enabling separation of the reclamation polymer from the remainder of the mixture. More specifically, as a result of grinding, the reclamation polymer may be reduced to a powder while the remaining material having a lower glass transition temperature may remain fibrous. Alternatively, the laminate material is delaminated to such an extent that each of the laminate layers or components is mutually separated. The reclamation polymer can be separated from the remaining particles by screening, using fluidized beds, or any other suitable method of separation based on particle size.

The method of the invention is particularly suitable for separating mixed polymer waste streams, such as nonwoven-elastic composite materials, from such processes as stretch-bond laminating processes as disclosed, for example, in U.S. Pat. No. 4,720,415 to Vander Wielen et al., and vertical filament laminating processes as disclosed, for example, in PCT publication WO 01/88245 to Welch et al., published Nov. 22, 2001. The method of the invention is also well suited to separating mixed polymer waste streams resulting from the manufacture of a variety of materials such as nonwoven fabric made with multi-component polymeric strands. The method can be used to separate polypropylene, polyethylene, and/or linear low density polyethylene, for example, from such waste streams.

One example of a nonwoven material made with multi-component polymeric strands is described in U.S. Pat. No. 5,336,552, issued Aug. 9, 1994, to Strack, et al. More particularly, this material is a nonwoven fabric made with multi-component polymeric strands including a blend of polyolefin and ethylene alkyl acrylate copolymer. Using the method of the invention to separate the waste material resulting from making this material, a polypropylene portion can be reduced to a powder while leaving a polyethylene portion in a fibrous or fibrillar form since polypropylene has a higher glass transition temperature than polyethylene. Although polyethylene would likely suffer some extent of size reduction, it should maintain a fibrous shape that would enable separation from the polypropylene portion through the use of screens or a fluidized bed.

Specific geometries of particles that lend feasibility to the separation process can be achieved by fracturing or grinding or delaminating the mixture at specific temperatures. Since polypropylene has a higher glass transition temperature than polyethylene or linear low density polyethylene, polypropylene can be fractured to powder form while polyethylene or linear low density polyethylene remains fibrous, thus enabling reclamation of the polypropylene. Alternatively, when applying the method of the invention to a mixture that includes polyethylene or linear low density polyethylene along with a polymer having an even lower glass transition temperature, the polyethylene and/or linear low density polyethylene can also be reduced to a powder form using liquid nitrogen and a grinder, thus enabling reclamation of the polyethylene or linear low density polyethylene.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method of separating mixed polymers, comprising:
    imparting mechanical energy to a mixture including a first polymer and a second polymer at a temperature where one of the polymers is brittle;
    controlling a temperature of the mixture, thereby bringing the temperature of the mixture to said temperature to cause decombination of the polymer mixture; and
    separating the first polymer from the second polymer;
    wherein the mechanical energy is imparted by at least one of a group consisting of impact, shear force, ultrasonic force, and combinations thereof.

2. The method of claim 1, wherein the temperature of the mixture is controlled by cooling the mixture.

3. The method of claim 1, wherein the temperature of the mixture is controlled by heating the mixture.

4. The method of claim 1, comprising imparting mechanical energy to the mixture and subsequently controlling the temperature of the mixture.

5. The method of claim 1, comprising controlling a temperature of the mixture and subsequently imparting mechanical energy to the mixture.

6. The method of claim 1, wherein the mixture comprises a stretch-bonded laminate waste stream.

7. The method of claim 1, wherein the mixture comprises a vertical filament laminate waste stream.

8. The method of claim 1, wherein the mixture comprises a waste stream from a nonwoven fabric made with multi-component polymeric strands.

9. The method of claim 1, wherein one of the polymers comprises polypropylene.

10. The method of claim 1, wherein one of the polymers comprises polyethylene.

11. The method of claim 1, wherein one of the polymers comprises linear low density polyethylene.

12. A method of separating mixed polymers, comprising:
    cooling a mixture including a first polymer and a second polymer to a temperature between a glass transition temperature of the first polymer and a glass transition temperature of the second polymer;
    grinding the mixture at a temperature between the glass transition temperature of the first polymer and the glass transition temperature of the second polymer; and
    separating the first polymer from the second polymer.

13. The method of claim 12, comprising using liquid nitrogen to cool the mixture.

14. The method of claim 12, comprising grinding the mixture such that the first polymer is ground into a powder and the second polymer remains fibrous.

15. The method of claim 12, comprising separating the first polymer from the second polymer by screening.

16. The method of claim 12, comprising separating the first polymer from the second polymer using fluidized beds.

17. The method of claim 12, wherein the mixture comprises a stretch-bonded laminate waste stream.

18. The method of claim 12, wherein the mixture comprises a vertical filament laminate waste stream.

19. The method of claim 12, wherein the mixture comprises a waste stream from a nonwoven fabric made with multi-component polymeric strands.

20. The method of claim 12, wherein one of the polymers comprises polypropylene.

21. The method of claim 12, wherein one of the polymers comprises polyethylene.

22. The method of claim 12, wherein one of the polymers comprises linear low density polyethylene.

23. A method of separating a reclamation polymer from a mixed polymer waste stream, comprising:
   adding liquid nitrogen to the mixed polymer waste stream in a grinding device;
   cooling the mixed polymer waste stream to a temperature below a glass transition temperature of the reclamation polymer;
   grinding the mixed polymer waste stream at a temperature below the glass transition temperature of the reclamation polymer; and
   separating the reclamation polymer from the mixed polymer waste stream using a fluidized bed.

24. The method of claim 23, comprising separating the reclamation polymer from the mixed polymer waste stream by screening.

25. The method of claim 23, comprising separating the reclamation polymer from the mixed polymer waste stream using fluidized beds.

26. The method of claim 23, wherein the mixed polymer waste stream comprises a stretch-bonded laminate waste stream.

27. The method of claim 23, wherein the mixed polymer waste stream comprises a vertical filament laminate waste stream.

28. The method of claim 23, wherein the mixed polymer waste stream comprises a waste stream from a nonwoven fabric made with multi-component polymeric strands.

29. The method of claim 23, wherein the reclamation polymer comprises polypropylene.

30. The method of claim 23, wherein the reclamation polymer comprises polyethylene.

31. The method of claim 23, wherein the reclamation polymer comprises linear low density polyethylene.

* * * * *